United States Patent
Ryu et al.

(10) Patent No.: US 10,694,434 B2
(45) Date of Patent: Jun. 23, 2020

(54) METHOD AND BASE STATION FOR SUPPORTING HANDOVER

(71) Applicant: LG ELECTRONICS INC., Seoul (KR)

(72) Inventors: Jinsook Ryu, Seoul (KR); Hyunsook Kim, Seoul (KR); Myungjune Youn, Seoul (KR); Sangmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 44 days.

(21) Appl. No.: 15/862,359

(22) Filed: Jan. 4, 2018

(65) Prior Publication Data

US 2018/0192337 A1    Jul. 5, 2018

Related U.S. Application Data

(60) Provisional application No. 62/442,949, filed on Jan. 5, 2017.

(51) Int. Cl.
*H04W 36/00* (2009.01)
*H04W 36/14* (2009.01)

(52) U.S. Cl.
CPC ....... *H04W 36/0066* (2013.01); *H04W 36/14* (2013.01)

(58) Field of Classification Search
CPC .......................... H04W 36/0066; H04W 36/14
USPC .......................................................... 455/438
See application file for complete search history.

(56) References Cited

U.S. PATENT DOCUMENTS

| | | | | |
|---|---|---|---|---|
| 9,629,052 B2* | 4/2017 | Okita et al. | ........... | H04W 36/22 455/438 |
| 2011/0194530 A1* | 8/2011 | Tinnakornsrisuphap | .................... | H04W 36/04 370/331 |
| 2014/0307707 A1* | 10/2014 | Mestanov | ......... | H04W 36/0066 370/331 |
| 2016/0080998 A1* | 3/2016 | Fukuta | .................. | H04W 48/20 370/331 |

\* cited by examiner

*Primary Examiner* — Shahriar Behnamian
(74) *Attorney, Agent, or Firm* — Lee Hong Degerman Kang & Waimey

(57) ABSTRACT

A source BS may determine that handover of a UE to a target BS is needed and transmit a handover request message indicating a request of handover to the target BS to a network node to which the source BS is connected. The handover request message may include radio access network (RAN) type information indicating a target RAN and radio access technology (RAT) type information indicating a target RAT.

4 Claims, 11 Drawing Sheets

(a) UE-P-GW user plane with E-UTRAN (b) Control Plane UE-MME

METHOD AND BASE STATION FOR SUPPORTING HANDOVER

CROSS-REFERENCE TO RELATED APPLICATIONS

Pursuant to 35 U.S.C. § 119(e), this application claims the benefit of U.S. Provisional Patent Application No. 62/442,949, filed on Jan. 5, 2017, the contents of which are hereby incorporated by reference herein in its entirety.

TECHNICAL FIELD

The present invention relates to a wireless communication system and, more particularly, to a method and apparatus for supporting handover.

BACKGROUND ART

Wireless communication systems are widely deployed to provide various kinds of communication content such as voice and data services. Generally, these communication systems are multiple access systems capable of supporting communication with multiple users by sharing available system resources (e.g., bandwidth and transmission power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, a method for transmitting/receiving signals effectively in a system supporting new radio access technology is required.

As functions of a new network have been introduced, a method of supporting handover of a UE needs to be changed.

The technical objects that can be achieved through the present invention are not limited to what has been particularly described hereinabove and other technical objects not described herein will be more clearly understood by persons skilled in the art from the following detailed description.

SUMMARY

Accordingly, the present invention is directed to a method and apparatus for supporting handover that substantially obviate one or more problems due to limitations and disadvantages of the related art.

According to an aspect of the present invention, provided herein is a method of supporting handover of a user equipment (UE) by a base station (BS). The method includes determining that handover of the UE to a target BS is needed, and transmitting a handover request message indicating a request of handover to the target BS to a network node to which the BS is connected, wherein the handover request message includes radio access network (RAN) type information indicating a target RAN and radio access technology (RAT) type information indicating a target RAT.

According to another aspect of the present invention, provided herein a base station (BS) for supporting handover of a user equipment (UE). The BS includes a radio frequency (RF) unit and a processor configured to control the RF unit. The processor is configured to determine that handover of the UE to a target BS is needed and control the RF unit to transmit a handover request message indicating a request of handover to the target BS to a network node to which the BS is connected, and the handover request message includes radio access network (RAN) type information indicating a target RAN and radio access technology (RAT) type information indicating a target RAT.

In each aspect of the present invention, the handover request message may include the RAT type information when the target BS is an access node of a next generation system.

In each aspect of the present invention, the RAT type information may indicate whether the target RAT is at least new radio (NR) corresponding to a RAT of a next generation system or long term evolution (LTE) corresponding to a RAT of an evolved packet system.

In each aspect of the present invention, the handover request message may further include handover type information indicating whether handover is handover to a next generation system.

In each aspect of the present invention, the network node may be a mobility management entity (MME).

In each aspect of the present invention, the BS may be an access node of an evolved packet system network.

The above technical solutions are merely some parts of the embodiments of the present invention and various embodiments into which the technical features of the present invention are incorporated can be derived and understood by persons skilled in the art from the following detailed description of the present invention.

According to the present invention, handover of a UE in a new communication system can be smoothly supported.

According to the present invention, a wireless communication signal of a new system can be transmitted/received while maintaining compatibility with a legacy system.

According to the present invention, radio communication signals can be efficiently transmitted/received. Therefore, overall throughput of a radio communication system can be improved.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWING

The accompanying drawings, which are included to provide a further understanding of the invention, illustrate embodiments of the invention and together with the description serve to explain the principle of the invention.

DETAILED DESCRIPTION

Figure 1:
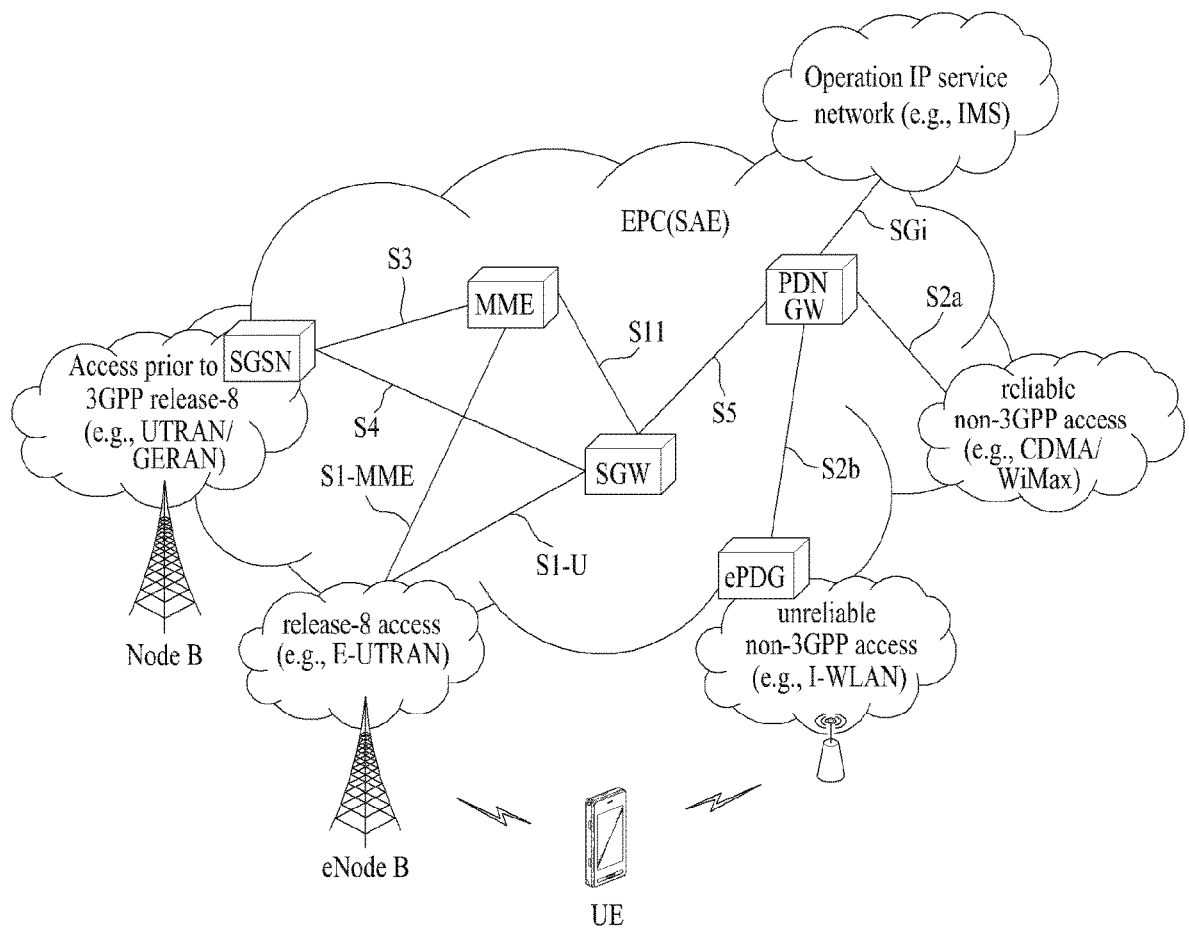
FIG. 1 is a schematic diagram showing the structure of an evolved packet system (EPS) including an evolved packet core (EPC).

Although the terms used in the present invention are selected from generally known and used terms while considering functions of the present invention, they may vary according to intention or customs of those skilled in the art or emergence of new technology. Some of the terms mentioned in the description of the present invention may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

The embodiments of the present invention described hereinbelow are combinations of elements and features of the present invention. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a" (or "an"), "one", "the", etc. may include a singular representation and a plural representation in the context of the present invention (more particularly, in the context of the following claims) unless indicated otherwise in the specification or unless context clearly indicates otherwise.

The embodiments of the present invention can be supported by standard specifications disclosed for at least one of wireless access systems including an institute of electrical and electronics engineers (IEEE) 802.xx, a 3rd generation partnership project (3GPP) system, a 3GPP Long Term Evolution (3GPP LTE) system, and a 3GPP2 system. That is, steps or parts that are not described to clarify the technical features of the present invention may be explained with reference to the above standard specifications.

In addition, all terms set forth herein may be explained by the above standard specifications. For example, the present disclosure may be incorporated by reference by one or more of standard specifications, such as 3GPP TS 36.300, 3GPP TS 36.321, 3GPP TS 36.322, 3GPP TS 36.323, 3GPP TS 36.331, 3GPP TS 23.303, 3GPP TS 23.401, 3GPP TS 24.301, 3GPP TS 36.413, 3GPP TS 36.423, and 3GPP NR standard documents, 38.xxx series (e.g. 3GPP TS 38.413) may be referenced.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

Specific terms used for the embodiments of the present invention are provided to aid in understanding of the present invention. These specific terms may be replaced with other terms within the scope and spirit of the present invention.

The terms used in this specification are defined as follows.

IMS (IP Multimedia Subsystem or IP Multimedia Core Network Subsystem): An architectural framework for providing standardization for delivery of voice or other multimedia services over Internet protocol (IP).

UMTS (Universal Mobile Telecommunications System): Global System for Mobile Communication (GSM)-based 3rd generation mobile communication technology developed by 3GPP. The UMTS is often called 3G system.

EPS (Evolved Packet System): A network system configured by an EPC (Evolved Packet Core), which is an Internet Protocol (IP)-based packet switched (PS) core network and an access network such as LTE, UTRAN, etc. The EPS is evolved from UMT.

NodeB: A base station of GERAN/UTRAN which is installed outdoors and has coverage of a macro cell scale. In other words, the NodeB is a base station of a UMTS network.

eNodeB/eNB: A base station of E-UTRAN which is installed outdoors and has coverage of a macro cell scale. In other words, the eNB is a base station of an EPC network.

UE (User Equipment): A user equipment. The UE may be referred to as a terminal, ME (Mobile Equipment), MS (Mobile Station), or the like. The UE may be a portable device such as a notebook computer, cellular phone, PDA (Personal Digital Assistant), smartphone, and multimedia device, or may be a nonportable device such as a PC (Personal Computer) and vehicle-mounted device. The term UE or terminal in the description of MTC may refer to an MTC device.

HNB (Home NodeB): A base station of a UMTS network. The HNB is installed indoors and has coverage of a micro cell scale.

HeNB (Home eNodeB): A base station of an EPS network. The HeNB is installed indoors and has coverage of a micro cell scale.

MME (Mobility Management Entity): A network node of the EPS network performing functions of Mobility Management (MM) and Session Management (SM).

PDN-GW (Packet Data Network-Gateway)/PGW/P-GW: A network node of the EPS network performing functions of UE IP address allocation, packet screening and filtering, and charging data collection.

SGW (Serving Gateway)/S-GW: A network node of the EPS network performing functions of mobility anchor, packet routing, idle mode packet buffering, and triggering of the MME paging the UE.

PCRF (Policy and Charging Rule Function): A network node of the EPS network making a policy decision for dynamically applying a differentiated QoS and charging policy on a service flow basis.

OMA DM (Open Mobile Alliance Device Management): A protocol designed for management of mobile devices such as a cellular phone, a PDA, and a portable computer, that performs functions of device configuration, firmware upgrade, and error report.

OAM (Operation Administration and Maintenance): A group of network management functions that provides network defect indication, performance information, and data and diagnosis functions.

NAS (Non-Access Stratum): An upper stratum of a control plane between the UE and the MME. The NAS is a functional layer for signaling between a UE and a core network and exchange of a traffic message between the UE and the core network in LTE/UMTS protocol stack. The NAS mainly functions to support UE mobility and a session management procedure for establishing and maintaining IP connection between a UE and a PDN GW.

EMM (EPS Mobility Management): A sub-layer of a NAS layer, that may be in either an "EMM-Registered" or "EMM-Deregistered" state depending on whether a UE is attached to or detached from a network.

ECM (EMM Connection Management) connection: A signaling connection for exchange of a NAS message, established between the UE and an MME. The ECM connection is a logical connection consisting of an RRC connection between the UE and an eNB and an S1 signaling connection between the eNB and the MME. If the ECM connection is established/terminated, the RRC connection and the S1 signaling connection are all established/terminated as well. To the UE, an established ECM connection means having an RRC connection established with the eNB and, to the MME, the established ECM connection means having an SI signaling connection established with the eNB. Depending on whether a NAS signaling connection, i.e., the ECM connection, is established, ECM may be in either "ECM-Connected" or "ECM-Idle" state.

AS (Access-Stratum): This includes a protocol stack between the UE and a wireless (or access) network and is in charge of data and network control signal transmission.

NAS configuration MO (Management Object): An MO used in the process of configuring parameters related to NAS functionality for the UE.

PDN (Packet Data Network): A network where a server (e.g., an MMS (Multimedia Messaging Service) server, a WAP (Wireless Application Protocol) server, etc.) supporting a specific service is located.

PDN connection: A logical connection between a PDN and a UE represented by one IP address (one IPv4 address and/or one IPv6 prefix).

APN (Access Point Name): A text sequence for indicating or identifying a PDN. A requested service or network is accessed through a specific P-GW. The APN means a predefined name (text sequence) in a network so as to discover this P-GW. (e.g., internet.mnc012.mcc345.gprs).

RAN (Radio Access Network): A unit including a NodeB, an eNodeB and an RNC (Radio Network Controller) for controlling the NodeB and the eNodeB in a 3GPP network. The RAN is present between UEs and provides connection to the core network.

HLR (Home Location Register)/HSS (Home Subscriber Server): A database containing subscriber information of a 3GPP network. The HSS can perform functions such as configuration storage, identity management and user state storage.

PLMN (Public Land Mobile Network): A network configured for the purpose of providing mobile communication services to individuals. This network can be configured per operator.

ANDSF (Access Network Discovery and Selection Function): One network entity that provides a policy to discover and select access that the UE can use with respect to each service provider.

EPC path (or infrastructure data path): A user plane communication path through an EPC.

E-RAB (E-UTRAN Radio Access Bearer): Concatenation of an S1 bearer and a data radio bearer corresponding to the S1 bearer. If the E-RAB is present, there is one-to-one mapping between the E-RAB and an EPS bearer of a NAS.

GTP (GPRS Tunneling Protocol): A group of IP-based communication protocols used to carry a general packet radio service (GPRS) within GSM, UMTS, and LTE networks. In 3GPP architectures, GTP and proxy mobile IPv6 based interfaces are specified on various interface points. The GTP can be decomposed into some protocols (e.g., GTP-C, GTP-U, and GTP'). GTP-C is used within a GPRS core network for signaling between gateway GPRS support nodes (GGSN) and serving GPRS support nodes (SGSN). GTP-C allows the SGSN to activate a session on a user's behalf (e.g., PDN context activation), deactivate the same session, adjust quality of service parameters, or update a session for a subscriber that has just arrived from another SGSN. GTP-U is used to carry user data within the GPRS core network and between a radio access network and a core network.

Proximity service (or ProSe service or proximity based service): A service for enabling discovery and mutual direct communication, communication via an eNB, or communication via a third device, between physically adjacent devices. In this case, user plane data is exchanged through a direct data path without passing through a 3GPP core network (e.g., EPC).

EPC path (or infrastructure data path): A user plane communication path through an EPC.

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network.

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference Point | Description |
| --- | --- |
| S1-MME | Reference point for the control plane protocol between E-UTRAN and MME. |
| S1-U | Reference point between E-UTRAN and Serving GW for the per bearer user plane tunneling and inter eNB path switching during handover. |
| S3 | It enables user and bearer information exchange for inter 3GPP access network mobility in idle and/or active state. This reference point can be used |

TABLE 1-continued

| Reference Point | Description |
|---|---|
| | intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and Serving GW. |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses.) |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
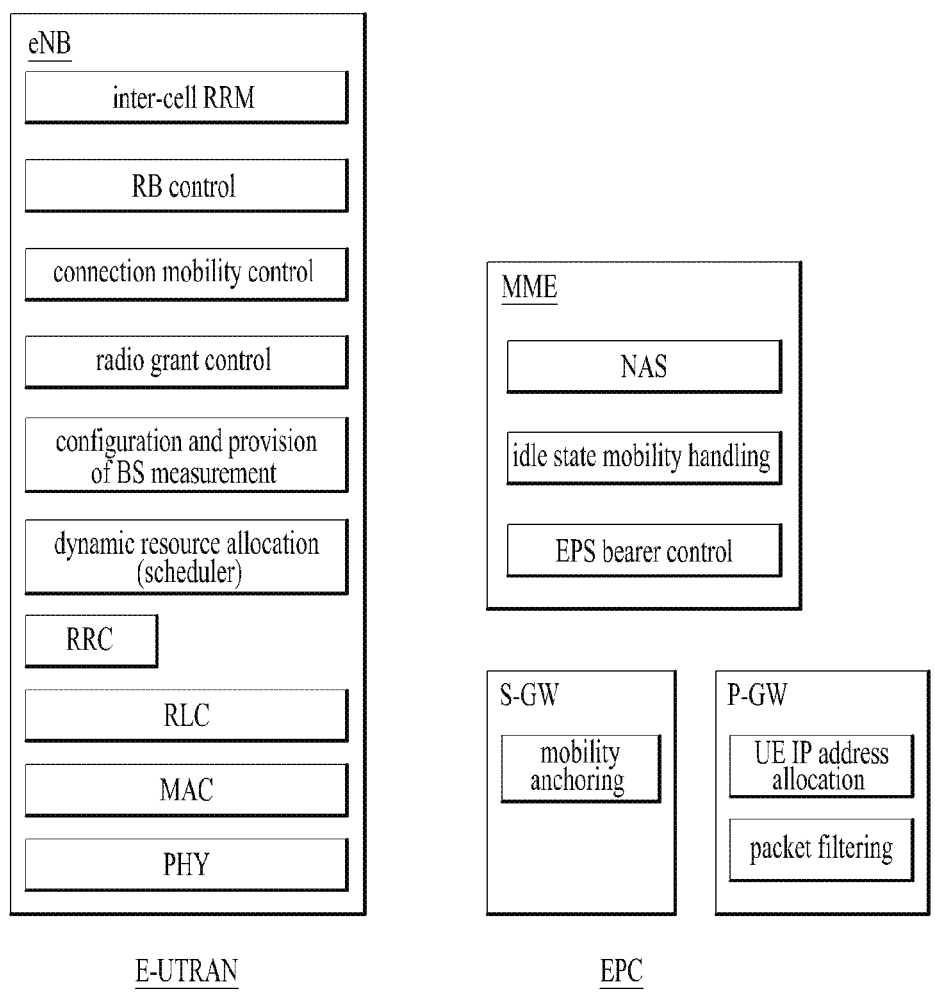
FIG. 2 is a diagram exemplarily illustrating architectures of a general E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
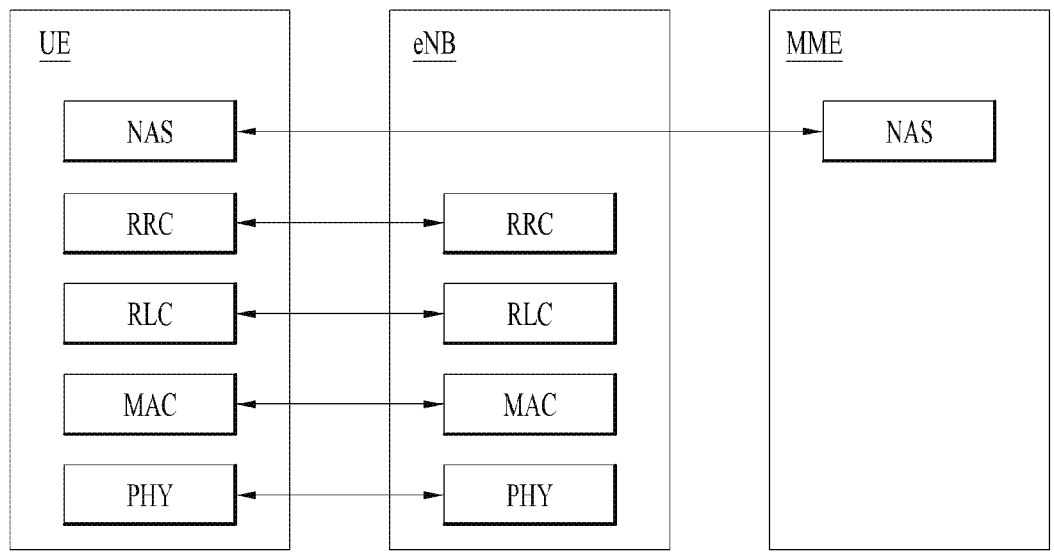
FIG. 3 is a diagram exemplarily illustrating the structure of a radio interface protocol in a control plane.
Figure 4:
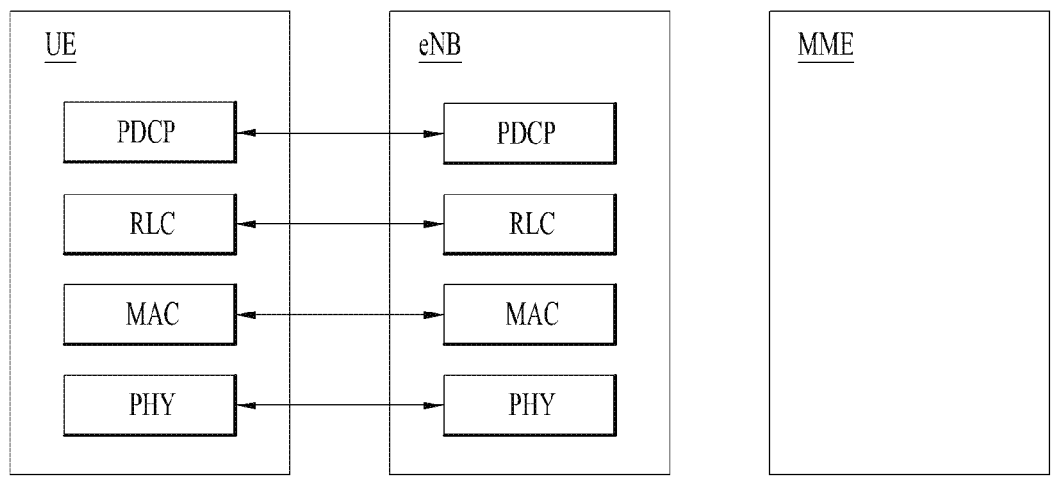
FIG. 4 is a diagram exemplarily illustrating the structure of a radio interface protocol in a user plane.

FIG. 3 is a diagram exemplarily illustrating the structure of a radio interface protocol in a control plane between a UE and an eNB, and FIG. 4 is a diagram exemplarily illustrating the structure of a radio interface protocol in a user plane between the UE and the eNB.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The ESM (Evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

The UE requested PDN connectivity procedure is for a UE to request the setup of a default EPS bearer to a PDN. The UE requests connectivity to a PDN by sending a PDN connectivity request message to the network. If accepted by the network, this procedure initiates the establishment of a default EPS bearer context. If EMM-REGISTERED without PDN connection is not supported by the UE or the MME, for the UE having no PDN connection, the procedure is used either to establish the first default bearer by including the PDN connectivity request message into the initial attach message. Otherwise, the procedure is used to establish subsequent default bearers to additional PDNs in order to allow the UE simultaneous access to multiple PDNs by sending the message stand-alone. If EMM-REGISTERED without PDN connection is supported by the UE and the MME, the procedure is used to establish the first or subsequent default bearers to a PDN or additional PDNs by sending the PDN connectivity request message stand-alone.

When the PDN connectivity request message is sent together with an attach request message, the UE may not include the APN. In order to request connectivity to a PDN using the default APN, the UE includes the access point name IE in the PDN connectivity request message or, when applicable, in the ESM information response message, according to specific conditions. In order to request connectivity to an additional PDN using a specific APN, the UE includes the requested APN in the PDN request message.

Figure 5:
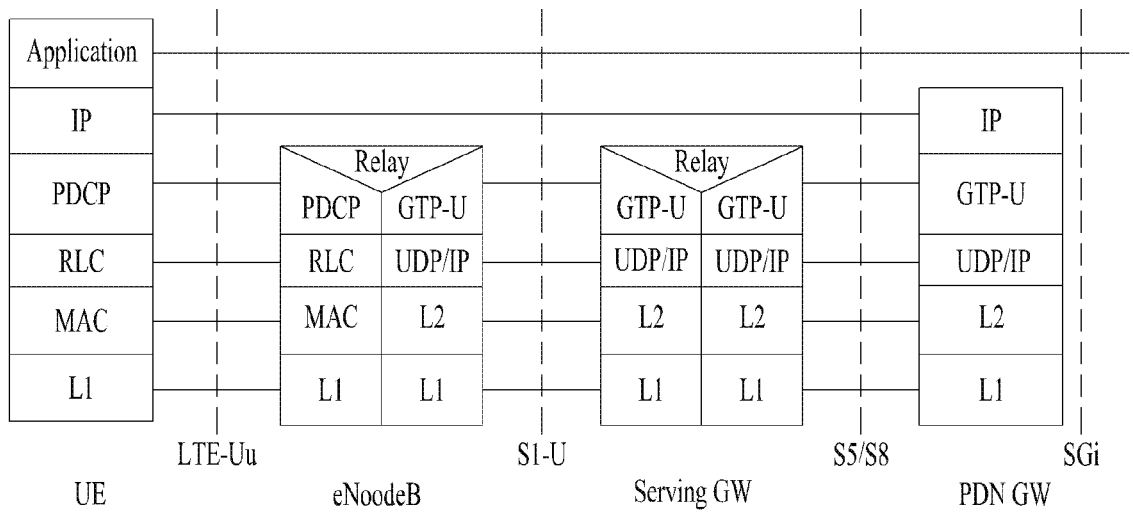
FIG. 5 is a diagram illustrating LTE (Long Term Evolution) protocol stacks for a user plane and a control plane.
Figure 5:
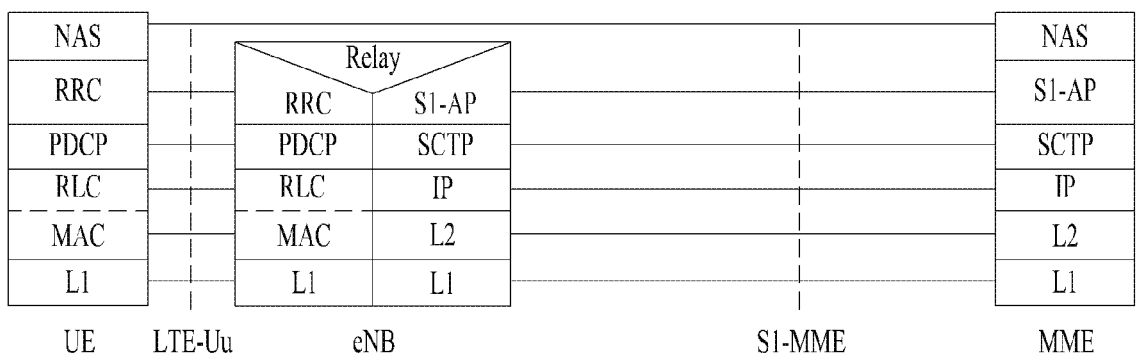

FIG. 5 illustrates LTE protocol stacks for a user plane and a control plane. FIG. 5(a) illustrates user plane protocol stacks over UE-eNB-SGW-PGW-PDN and FIG. 5(b) illustrates control plane protocol stacks over UE-eNB-MME-SGW-PGW. Functions of key layers of the protocol stacks will now be briefly described below.

Referring to FIG. 5(a), a GTP-U protocol is used to forward user IP packets over an S1-U/S5/X2 interface. If a GTP tunnel is established to forward data during LTE handover, an end marker packet is transferred to the GTP tunnel as the last packet.

Referring to FIG. 5(b), an S1-AP protocol is applied to an S1-MME interface. The S1-AP protocol supports functions such as S1 interface management, E-RAB management, NAS signaling delivery, and UE context management. The S1-AP protocol transfers an initial UE context to the eNB in order to set up E-RAB(s) and then manages modification or release of the UE context. A GTP-C protocol is applied to S11/S5 interfaces. The GTP-C protocol supports exchange of control information for generation, modification, and termination of GTP tunnel(s). The GTP-C protocol generates data forwarding tunnels in the case of LTE handover.

A description of the protocol stacks and interfaces illustrated in FIGS. 3 and 4 is applicable to the same protocol stacks and interfaces illustrated in FIG. 5.

Figure 6:
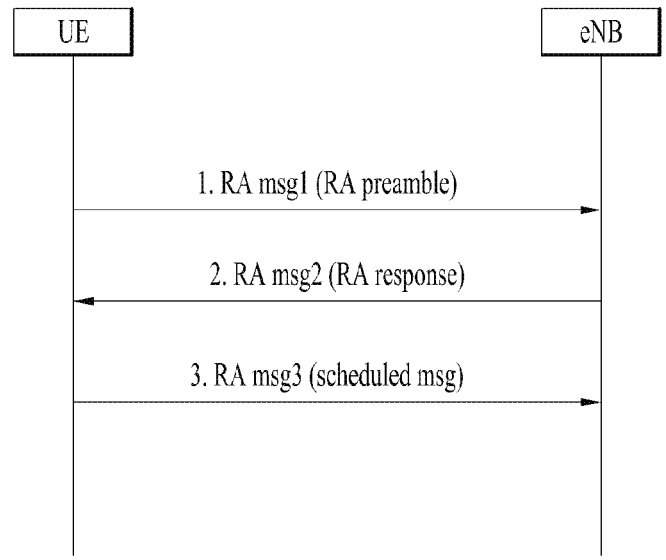
FIG. 6 is a flow diagram illustrating a random access procedure.

FIG. 6 is a flowchart illustrating a random access procedure in 3GPP LTE.

The random access procedure is used for a UE to obtain UL synchronization with a base station or to be assigned a UL radio resource.

The UE receives a root index and a physical random access channel (PRACH) configuration index from an eNB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The random access procedure, in particular, a contention-based random access procedure, includes the following three steps. Messages transmitted in the following steps 1, 2, and 3 are referred to as msg1, msg2, and msg4, respectively.

1. The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

2. Upon receiving the random access preamble, the eNB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH. The RAR includes timing advance (TA) information indicating timing offset information for UL synchronization, UL resource allocation information (UL grant information), and a temporary UE identifier (e.g., a temporary cell-RNTI (TC-RNTI)).

3. The UE may perform UL transmission according to resource allocation information (i.e., scheduling information) and a TA value in the RAR. HARQ is applied to UL transmission corresponding to the RAR. Accordingly, after performing UL transmission, the UE may receive reception response information (e.g., a PHICH) corresponding to UL transmission.

Figure 7:
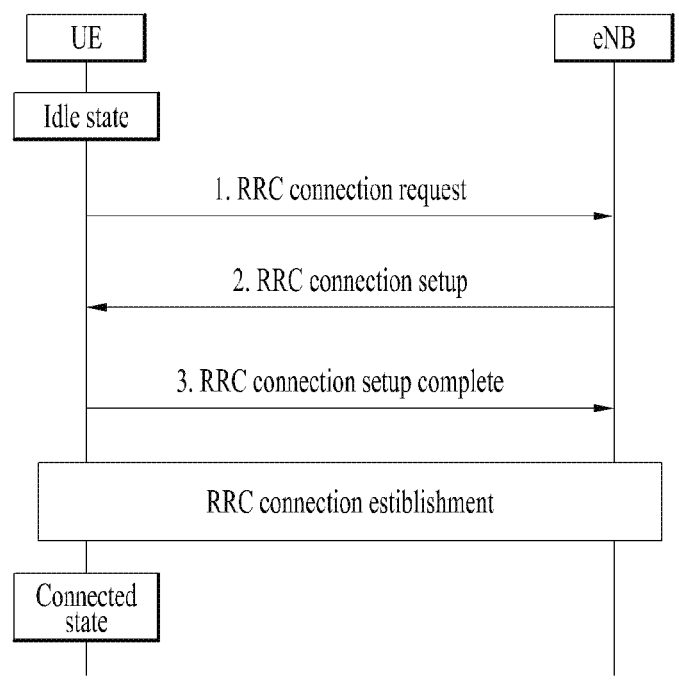
FIG. 7 is a diagram illustrating a connection procedure in a radio resource control (RRC) layer.

FIG. 7 illustrates a connection procedure in a radio resource control (RRC) layer.

As shown in FIG. 7, the RRC state is set according to whether or not RRC connection is established. An RRC state indicates whether or not an entity of the RRC layer of a UE has logical connection with an entity of the RRC layer of an eNB. An RRC state in which the entity of the RRC layer of the UE is logically connected with the entity of the RRC layer of the eNB is called an RRC connected state. An RRC state in which the entity of the RRC layer of the UE is not logically connected with the entity of the RRC layer of the eNB is called an RRC idle state.

A UE in the Connected state has RRC connection, and thus the E-UTRAN may recognize presence of the UE in a cell unit. Accordingly, the UE may be efficiently controlled. On the other hand, the eNB cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, does the UE establish RRC connection with the RRC layer of the eNB through the RRC connection procedure and then transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNB, transmission of an RRC connection setup message from the eNB to the UE, and transmission of an RRC connection setup complete message from the UE to eNB, which are described in detail below with reference to FIG. 7.

1. When the UE in the idle state desires to establish RRC connection for reasons such as an attempt to make a call, a data transmission attempt, or a response of the eNB to paging, the UE transmits an RRC connection request message to the eNB first.

2. Upon receiving the RRC connection request message from the UE, the eNB accepts the RRC connection request of the UE when the radio resources are sufficient, and then transmits an RRC connection setup message, which is a response message, to the UE.

3. Upon receiving the RRC connection setup message, the UE transmits an RRC connection setup complete message to the eNB.

Only when the UE successfully transmits the RRC connection setup complete message, does the UE establish RRC connection with the eNB and transition to the RRC connected mode.

In order for the UE of an idle state to transition to an activation state in which traffic transmission/reception can be performed due to occurrence of new traffic, a service request procedure is performed. If traffic to be transmitted by the UE occurs or traffic to be transmitted to the UE by a network occurs in a state in which the UE is registered with the network but an S1 connection is released and a wireless resource is not allocated to the UE due to traffic inactivation, i.e., in a state in which the UE is in an EMM registered state (EMM-Registered) but is in an ECM-Idle state, the UE requests that the network provide a service. Upon successfully completing the service request process, the UE transitions to an ECM connected state (ECM-Connected) and configures an ECM connection (RRC connection+S1 signaling connection) in a control plane and an E-RAB (a data radio bearer (DRB) and an S1 bearer) in a user plane, thereby transmitting/receiving traffic. If the network desires to transfer traffic to the UE of an ECM idle state (ECM-Idle), the network informs the UE, through a paging message, that there is traffic to be transmitted so that the UE may request that the network provide a service.

Figure 8:
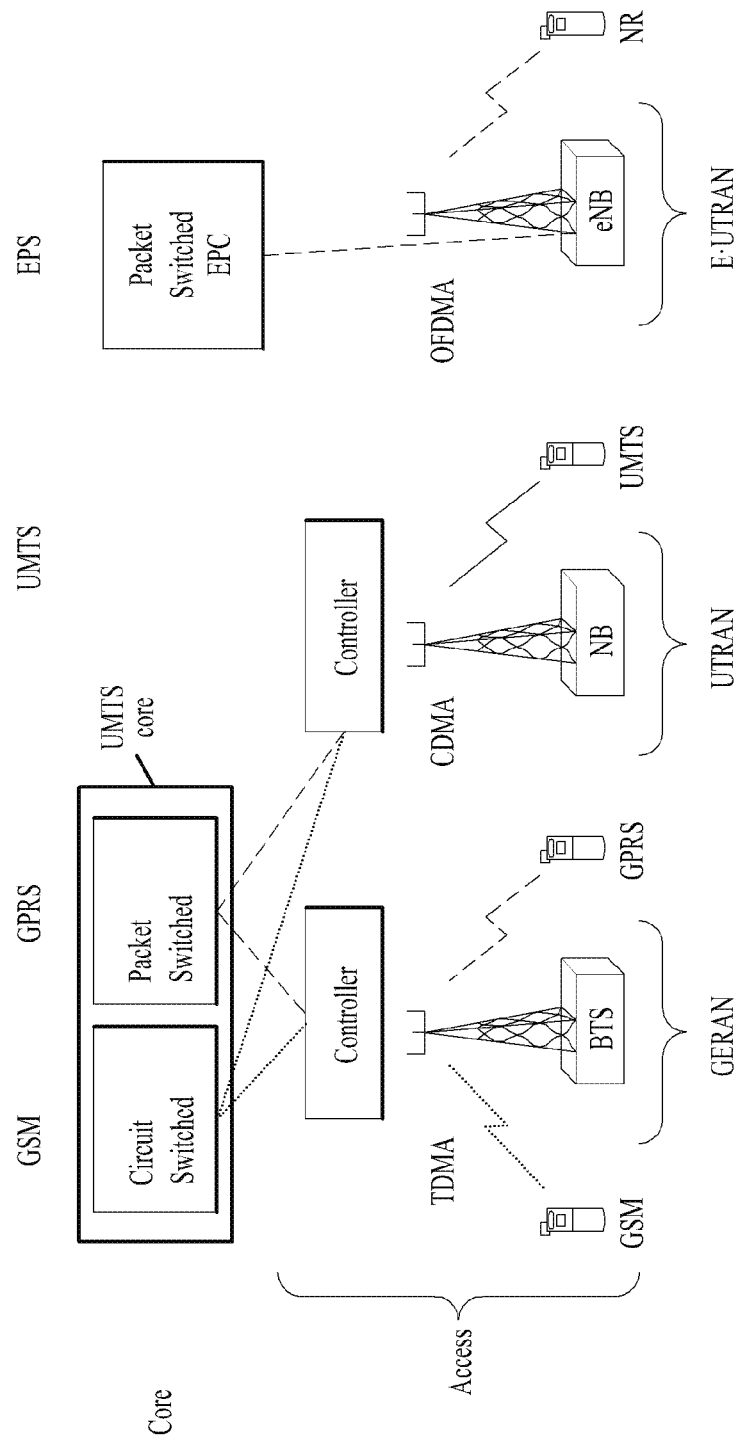
FIG. 8 illustrates the network solutions from GSM to LTE.

FIG. 8 illustrates the network solutions from GSM to LTE.

GSM was developed to carry real time services, in a circuit switched manner (dotted line in FIG. 8) with data services only possible over a circuit switched modem connection, with very low data rates. The first step towards an IP based packet switched (broken line in FIG. 8) solution was taken with the evolution of GSM to GPRS, using the same air interface and access method, TDMA (Time Division Multiple Access).

To reach higher data rates in UMTS (Universal Mobile Terrestrial System) a new access technology WCDMA (Wideband Code Division Multiple Access) was developed. The access network in UMTS emulates a circuit switched connection for real time services and a packet switched connection for datacom services (solid line in FIG. 8). In UMTS the IP address is allocated to the UE when a datacom service is established and released when the service is released. Incoming datacom services are therefore still relying upon the circuit switched core for paging.

The EPS is purely IP based. Both real time services and datacom services will be carried by the IP protocol. The IP address is allocated when the mobile is switched on and released when switched off. The new access solution, LTE, is based on OFDMA (Orthogonal Frequency Division Multiple Access) and in combination with higher order modulation (up to 64QAM), large bandwidths (up to 20 MHz) and spatial multiplexing in the downlink (up to 4×4) high data rates can be achieved. The highest theoretical peak data rate on the transport channel is 75 Mbps in the uplink, and in the downlink, using spatial multiplexing, the rate can be as high as 300 Mbps.

Meanwhile, users desires to perform smooth and seamless communication regardless of movement of their UEs. A method of capable of satisfying such a demand of users is handover. Therefore, in each system, schemes for supporting handover according to movement of a UE have been proposed. Although handover occurs between BSs in a homogeneous system, handover may occur even between heterogeneous systems. For example, handover may occur even between an E-UTRAN and a UTRAN. Handover between heterogeneous systems is called an inter-system handover. In a legacy communication system, a RAN, or a radio access technology (RAT), and its associated core network technology have had a relationship of 1:1. For example, if a radio interface is a UTRAN, the UE has determined that a UMTS core is present in the back of the UTRAN. Similarly, if the radio interface is LTE, the UE has determined that a core connected to the back of LTE is an EPC. If the RAT of a cell providing services to the UE is a 3G technology, an access node (AN) of the cell has been regarded to be a UTRAN and, if the RAT of a cell providing services to the UE is an E-UTRA, an AN of the cell has been regarded as an E-UTRAN. That is, a legacy BS does not support a plurality of RATs and, if a RAT differs, then a BS also differs. Therefore, in a legacy cellular network technology, since a single communication system has supported a single RAT, if handover occurs between RATs (e.g., GERAN, UTRAN, and E-UTRAN), associated systems (e.g., GPRS A/Gb, GPRS Iu, and EPS S1) have also been changed in one-to-one correspondence (refer to "Inter RAT handover" of 3GPP TS 23.401). For example, handover between a 3G radio technology and a 4G LTE technology meant handover between a UTRAN node (e.g. NodeB) and an E-UTRAN node (e.g., eNB) and handover between a UMTS and an EPS. As a result, inter-system handover in a legacy communication system meant inter-RAT handover and inter-RAT handover meant inter-system handover.

Although a radio communication technology has been developed up to LTE based on TDMA/WCDMA, demand and expectation of users and enterprisers have continued to increase. In addition, since other RATs have been developed, evolution of a new technology is demanded for competitiveness in the future. For example, reduction in costs per bit, increase in service availability, use of a flexible frequency band, a simple architecture and an open interface, appropriate power consumption of a UE, etc. are demanded. Therefore, a standardization task for providing a more improved mobile communication service relative to an EPS system based on current LTE and EPC is in progress. Hereinafter, a next generation mobile communication system will be referred to as a NextGen system or an NR system, a core of the next generation mobile communication system will be referred to as a next generation core (NGC) or a 5GC, a core network of the next generation mobile communication system will be referred to as a next core network (NCN), and a radio access network and a RAT associated with the radio access network will be referred to as a next radio (NR). A frequency band in which communication using LTE, i.e., a 4G technology, in a radio interface is performed is referred to as an LTE cell or a 4G cell. A frequency band in which communication using NR (e.g., 5G technology) in a radio interface is performed is referred to as an NR cell or a 5G cell. In addition, a next generation radio access network is referred to as an NG RAN, an N-RAN, a new RAN, or a next RAN. In the present invention, the NCN is also referred to as a NextGen core, an NG core network (CN), a 5G CN, or an NCN. A BS of an E-UTRAN is referred to as an eNB and a BS of NextGen is referred to as a gNB. LTE may be used as the same meaning as a RAT (E-UTRA). The evolution of eNB that supports connectivity to EPC and NGC is referred to as eLTE eNB. Hereinafter, the meaning of "a UE and a network node support an LTE cell" may indicate that the UE and the network node support an LTE AS layer protocol and the UE is capable of searching for the LTE cell. The meaning of "a UE and a network node support an NR cell" may indicate that the UE and the network node supports a new RAT, i.e., a new AS layer protocol, and the UE is capable of searching for the NR cell. The meaning of "a UE and a network node support an EPC" may indicate that the UE and the network node support an LTE NAS protocol and the meaning of "a UE and a network node support an NCN" may indicate that the UE and the network node support a NAS protocol of NextGen. A part of agreements on the overall architecture of an NR system will be described below.

The key architecture principles of the NR system comprise, for example: separating the user plane (UP) and control plane (CP) functions, allowing independent scalability and evolution; allowing for a flexible deployment of UP separate from CP functions, i.e., central location or distributed (remote) location (i.e. with no restriction in the location); modularizing the function design, e.g. to enable flexible and efficient network slicing; supporting a flexible information model with subscription and policy separated from network functions and nodes; and minimizing access and core network dependencies by specifying a converged access-agnostic core with a common AN-CN interface which integrates different 3GPP and non-3GPP access types. Modularizing the function design includes: supporting unified authentication framework for UEs which may support only subset of NGS functionality (e.g. not supporting mobility); and separated access and mobility management (AMF) and, session management (SMF) which enables independent evolution and scaling.

The control plane of the NR system enables multi-vendor interworking between access network and network functions within the core network and between the network functions within the core network. At the same time, it is sufficient that a single interface is exposed towards the radio while abstracting the modular (elementary) functions supported in the core network. Procedures (i.e. set of interactions between two network functions (NFs)) are defined as a service, wherever applicable, so that its re-use is possible and enables support for modularity.

For the NR system, a generic user-plane function (UPF) is defined, which supports various user-plane operations (incl. forwarding operations to other UP functions/data networks/the control-plane, bitrate enforcement operations, service detection operations, etc.). The control plane configures the UP functions to provide the traffic handling functionality needed for a session.

The 5G reference architecture consist of the following functions: unified data management (UDM); authentication server function (AUSF); policy control function (PCF); core access and mobility management function (AMF); session management function (SMF); user plane function (UPF); network exposure function (NEF); NF repository function (NRF); (radio) access network ((R)AN); user equipment (UE); data network (DN) (e.g. operator services, internet access or 3rd party services); and/or data storage network function (DSF). The AMF includes the following functionality: termination of RAN CP interface (NG2); termination of NAS (NG1), NAS ciphering and integrity protection; mobility management; lawful intercept (for AMF events and interface to LI System); transparent proxy for routing access authentication and SM messages; access authentication; access authorization; security anchor function (SEA) which interacts with the UDM and the UE, receives the intermediate key that was established as a result of the UE authentication process (c.f., in case of USIM based authentication, the AMF retrieves the security material from the UDM); security context management (SCM) which receives a key from the SEA that it uses to derive access-network specific keys. The SMF includes the following functionality: session management; UE IP address allocation & management (including optional authorization); selection and control of UP function; termination of interfaces towards policy control and charging functions; control part of policy enforcement and QoS; lawful intercept (for SM events and interface to LI system); termination of SM parts of NAS messages; downlink data notification; initiator of AN specific SM information, sent via AMF over NG2 to AN; and/or roaming functionality (e.g. Handle local enforcement to apply QoS SLAs (VPLMN), charging data collection and charging interface (VPLMN), lawful intercept (in VPLMN for SM events and interface to LI System)). The NG core user plane (NG-UP) function includes the following functionality: anchor point for intra-/inter-RAT mobility (when applicable); external PDU session point of interconnect (e.g. IP); packet routing & forwarding; QoS handling for user plane; packet inspection and policy rule enforcement; lawful intercept (UP collection); traffic accounting and reporting; support for interaction with external DN for transport of signalling for PDU session authorization/authentication by external DN. The 5G reference architecture contain the following reference points:

NG1: Reference point between the UE and the Access and Mobility Management function.

NG2: Reference point between the (R)AN and the Access and Mobility Management function.

NG3: Reference point between the (R)AN and the user plane function (UPF).

NG4: Reference point between the Session Management function (SMF) and the User plane function (UPF).

NG5: Reference point between the Policy Function (PCF) and an Application Function (AF).

NG6: Reference point between the UP function (UPF) and a Data Network (DN).

NG7: Reference point between the Session Management function (SMF) and the Policy Control function (PCF).

NG7r: Reference point between the vPCF and the hPCF.

NG8: Reference point between Unified Data Management and AMF.

NG9: Reference point between two Core User plane functions (UPFs).

NG10: Reference point between UDM and SMF.

NG11: Reference point between Access and Mobility Management function (AMF) and Session Management function (SMF).

NG12: Reference point between Access and Mobility Management function (AMF) and Authentication Server function (AUSF).

NG13: Reference point between UDM and Authentication Server function (AUSF).

NG14: Reference point between 2 Access and Mobility Management function (AMF).

NG15: Reference point between the PCF and the AMF in case of non-roaming scenario, V-PCF and AMF in case of roaming scenario.

NG16: Reference point between two SMFs, (in roaming case between V-SMF and the H-SMF).

More details of an NR system (e.g., 5G system) discussed up to now may refer to 3GPP TR 23.779 (e.g., 3GPP TR 23.779 V14.0.0).

Figure 9:
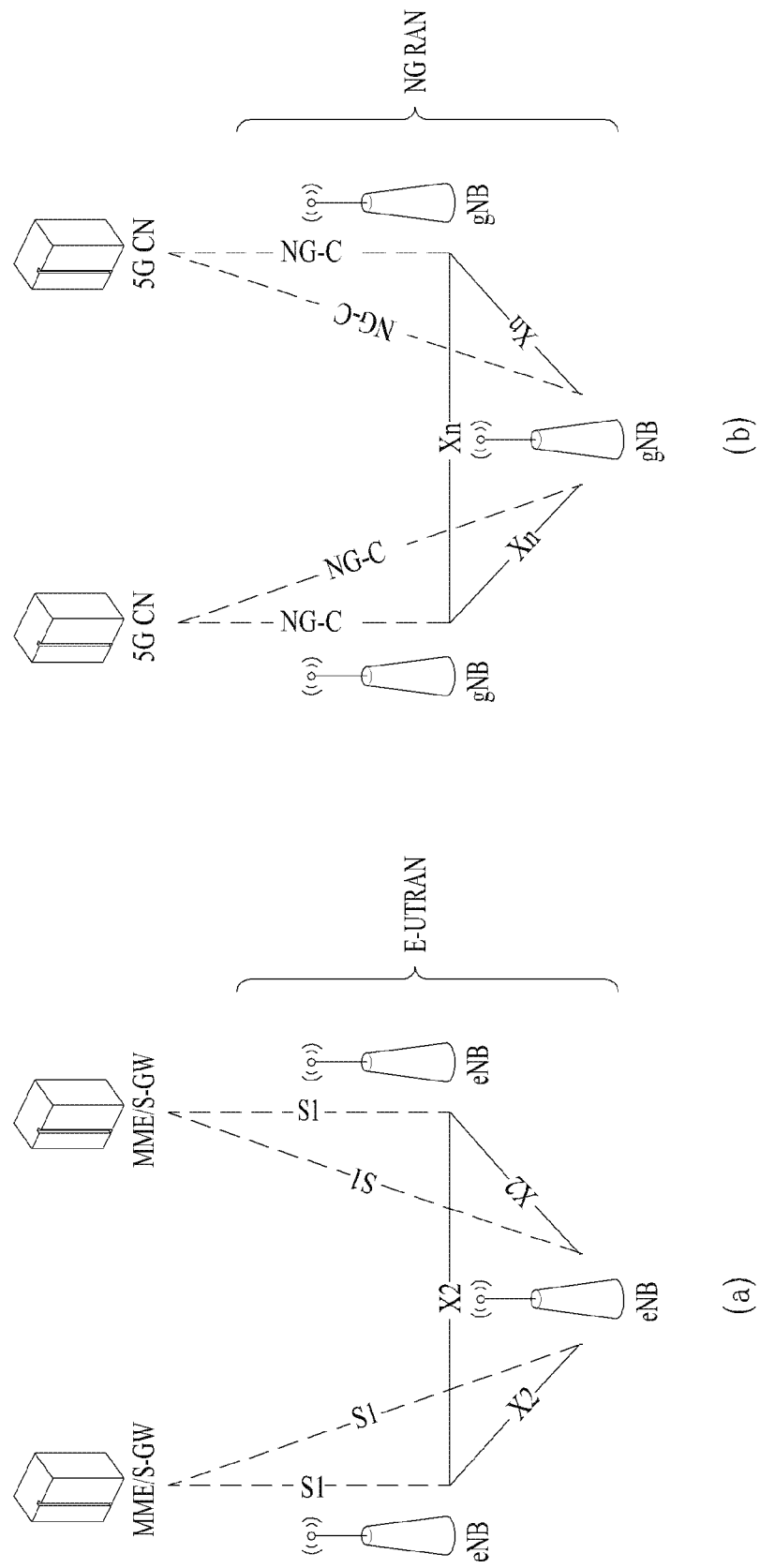
FIG. 9 illustrates an E-UTRAN architecture and a next generation radio access network (NG RAN) architecture.

FIG. 9 illustrates an E-UTRAN architecture and a next generation radio access network (NG RAN) architecture.

Referring to FIG. 9(a), an E-UTRAN includes eNBs that provide a UE with an E-UTRA user plane (PDCP/RLC/MAC/PHY) and control plane (RRC) protocol terminations. The eNBs are interconnected through an X2 interface. The eNBs are connected to evolved packet cores (EPCs) through an S1 interface. More specifically, the eNBs are connected to MMEs through an S1-MME interface and to serving gateways (S-GWs) through an S1-U interface. The S1 interface support a many-to-many relationship between the MMEs/S-GWs and eNBs.

Referring to FIG. 9(b), an interface through which gNBs are interconnected is referred to as an Xn interface. NG-C is a control plane interface used on NG2 reference points between a new RAN and a 5G CN. The new RAN includes gNBs for providing NR user plane and control plane protocol terminations to the UE.

The next generation mobile communication system is expected to support the following two network configurations.

(Mainly new) mobile communication enterprisers configure a network using only an NR and an NCN.

(Mainly existing) mobile communication enterprisers additionally install networks using the NR and the NCN while continuing to use EPC and LTE based networks.

From the viewpoint of a mobile communication enterpriser that is doing business by installing EPC and LTE networks, it is difficult to simultaneously replacing all existing equipment with NR/NCN based equipment due to the following reasons.

Remarkable cost is needed to install a new network.

It is not expected that existing LTE based service subscribers will simultaneously replace existing UEs with NR based UEs.

Existing network equipment cannot be simultaneously removed.

If an existing network is simultaneously replaced with a new network, it is difficult to perform stabilization and test of the network.

Therefore, an enterpriser having the EPC and LTE networks may wish to gradually upgrade the networks thereof from an LTE based network to an NR based network or continuously operate both the LTE network and the NR network. Alternatively, the enterpriser may first change the EPC to a 5G CN and use an LTE cell through connection to the EPC and the 5G CN. An LTE technology covers almost all areas but is slower in transmission rate than an NR technology. Meanwhile, the NR technology partially covers areas but is faster in transmission rate than the LTE technology. To support backward compatibility with a legacy communication system, it is expected that the gNB will support the LTE cell as well as an NR cell.

Therefore, a method of providing a stable service and an optimal communication service to legacy UEs and new UEs in an early stage of NR/NCN introduction is needed.

If 5G cells are not deployed with full coverage, a seamless service can be provided to users by interworking with the existing LTE network, which is already deployed with full coverage. When the network evolved from 3G to LTE, LTE cells were deployed by partial coverage when LTE was first commercialized. In order to overcome coverage shortage, the LTE network also provided seamless service to users by interworking with the 3G network. Interworking between the 3G network and the LTE network was developed by the Core Network-level interworking solution, in which a 3G Core Network entity, SGSN (Serving GPRS Support Node), directly interfaces with LTE Core Network Entities, MME (Mobility Management Entity) and S-GW (Serving Gateway). For 4G-5G interworking, two kinds of solutions, RAN-level interworking and CN-level interworking, are under discussion in 3GPP.

Figure 10:
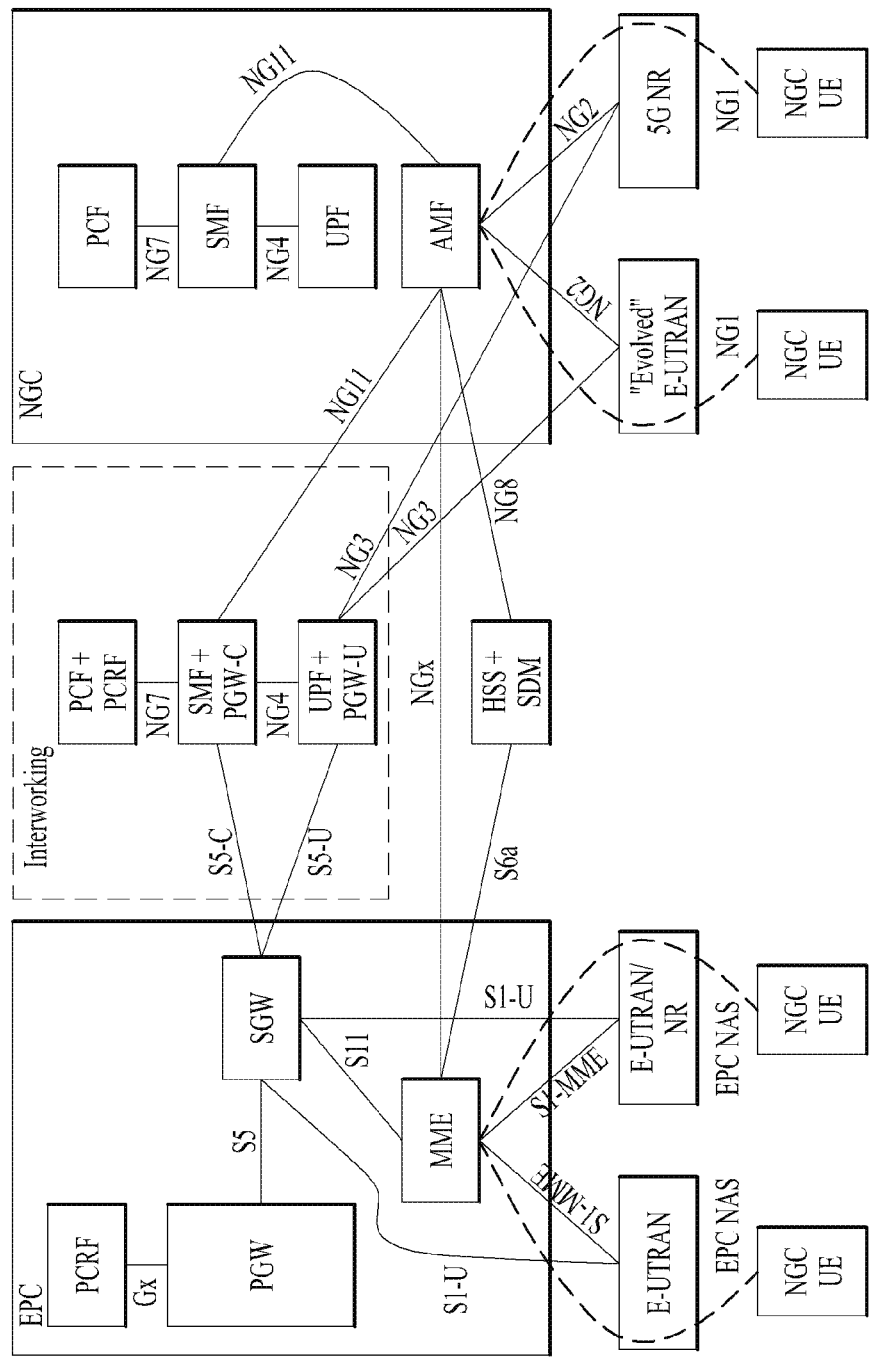
FIG. 10 illustrates an example of the interworking architecture with the EPC.

FIG. 10 illustrates an example of the interworking architecture with the EPC. In FIG. 10, "NGC UE" refers to a NG Core (NGC) capable UE, and "Evolved E-UTRA" refers to an evolution of the E-UTRA radio interface for operation in the NextGen system. The evolved E-UTRA may be also called "eLTE". A detailed description of FIG. 10 may refer to FIG. 6.18.2.1-2 of 3GPP TR 23.799 V14.0.0.

Referring to FIG. 10, when a UE supports both an EPC and an NGC, if the UE initially camps on the EPC through an E-UTRAN, if a P-GW (e.g. "UPF+PGW-U" in FIG. 10) that can interwork with a UPF of the NGC is selected as a P-GW which is an IP anchor point. Therefore, even when the UE moves between systems or RANs, the UE may maintain the same IP anchoring. An NGx (or Nx) interface between an MME and an AMF is defined so as to interwork without interruption.

Figure 11:
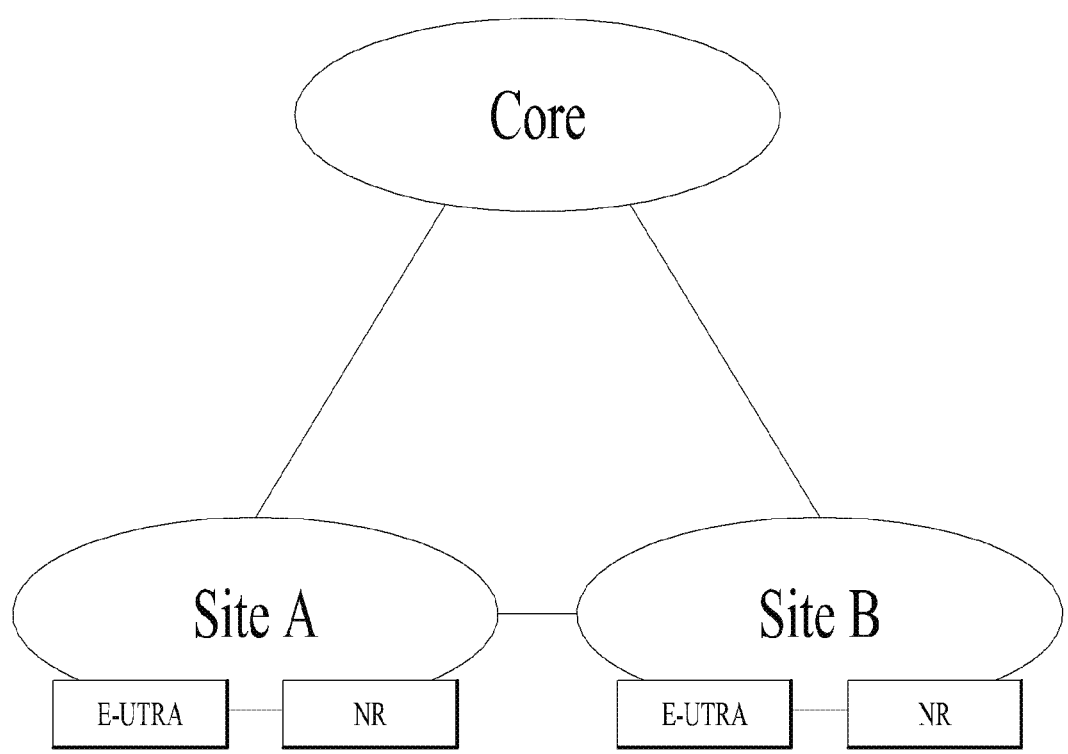
FIG. 11 illustrates an example of the new radio (NR) functionality being considered in the NR system.

FIG. 11 illustrates an example of the NR functionality being considered in the NR system. Especially, FIG. 11 shows a deployment scenario of the NR functionality, where the NR functionality is co-sited with E-UTRA functionality (see FIGS. 5.3-1 of 3GPP TR 38.801_V1.0.0). The NR functionality is co-sited with E-UTRA functionality either as part of the same base station or as multiple base stations at the same site. Co-sited deployment can be applicable in all NR deployment scenarios e.g. urban macro. In this scenario it is desirable to fully utilize all spectrum resources assigned to both RATs by means of load balancing or connectivity via multiple RATs (e.g. utilizing lower frequencies as coverage layer for users on cell edge).

In a legacy communication system, since a core network technology related to a RAN or a RAT was one to one correspondence, if the RAN is specified, a corresponding RAT and a corresponding core network as well as the RAN was able to be specified. For example, handover between UTRAN and E-UTRAN meant handover between a 3G radio technology and a 4G LTE technology, handover between a NodeB and, an eNB, and handover between a UMTS and an EPS. For this reason, in conventional handover, if a source eNB provides only handover type information indicating a source RAN and a target RAN to an MME in order to make a request for preparation of resources at the target, the target RAN and a target RAT are specified. For example, in conventional handover, a source eNB provides the MME with a Handover Required message including handover type information as to whether handover is performed from LTE to UTRAN, from LTE to GERAN, from UTRAN to LTE, or from GERAN to LTE. For reference, as described above, since a single system supports a single RAT according to a conventional cellular network technology, LTE indicated by the handover type information in the conventional Handover Required message means E-UTRAN.

However, as a 5G CN has been introduced, when a 5G RAN (e.g., an access node supporting interfaces such as NG1, NG2, NG3, etc.) interworking with the 5G CN supports not only NR, which is a 5G radio technology, but also 4G LTE, which is supported by a legacy E-UTRAN, both an E-UTRA technology and an NR technology correspond to a 5G RAN (i.e., gNB). For example, when a UE serviced by the E-UTRAN (i.e., a legacy eNB supporting an S1 interface) moves to 5G RAN coverage, the UE may move to an evolved E-UTRA cell or an NR cell. In this case, inter-system handover is performed from the eNB to the gNB or from an EPS to a 5G core (i.e., 5GC). That is, when the UE moves from the E-UTRAN to the 5G RAN, a RAT to which the UE can be handed over is not fixed to one RAT and may be the (evolved) E-UTRA or the NR. However, a QoS policy and QoS caused by a core network may be affected depending on to which RAT the UE moves. In consideration of this point, the present invention proposes an inter-system handover method considering characteristics of a 5G system. In particular, in order to support efficient inter-system handover when the 5G system (e.g., a 5G core) supports different RATs, e.g., eLTE, which is evolution of LTE, and NR, the present invention proposes providing a RAT of a target cell as well as a cause of handover when a source access network (AN) requests that a core network thereof perform handover. For example, when the source AN (e.g. E-UTRAN) requests that a core network node (e.g. MME) perform handover, a value indicating whether a RAT of a target cell is (e)LTE or NR as well as a cause value indicating inter-system handover from the E-UTRAN to the 5G-RAN may be included in a corresponding handover request message (e.g. handover required message). That is, the present invention proposes that, in a handover procedure, a source side provide a network node with information indicating which type of RAT is triggered as a RAT of handover, i.e., which RAT is a target RAT of corresponding handover. According to the present invention, a target system (e.g. AMF or SMF) may perform more appropriate handover. RAT type information provided in the handover procedure according to the present invention may be used as follows for example.

1) A UE-aggregate maximum bit rate (AMBR) value (enforced on the gNB) may be differently set according to whether a target cell is an NR cell or an eLTE cell. Here, the eLTE cell refers to an LTE cell supporting an NGC interface.

2) A PCF provides a UE policy. In this case, the UE policy may be provided to the UE via the AMF from the PCF and may differ according to a RAT type. For example, one of the potential policies considered in the NAR system is "access traffic steering" procedure that selects the "best" access network for a new data flow and transfers the traffic of this data flow over the selected "best" access network. If access traffic steering is applied to NR/eLTE and non-3GPP and a steering priority is determined in order of NR>non- 3GPP>eLTE, the RAT type information according to the present invention may be used for the purpose of providing a policy capable of steering a session, which is anchored in non-3GPP on a policy node, to an NR cell when a target cell is the NR cell. In other words, the RAT type information may be used for the policy node (e.g., PDF) to determine whether the policy is needed or to provide the policy according to whether a target RAT type is NR or eLTE.

3) In the case of a 5G RAT, user plane path selection may be very dynamic. For example, an NGC may provide a user plane function (UPF), which is called an uplink classifier (UL-CL), and an SMF may dynamically configure user plane path selection such that the SMF may consider the UL-CL when a target cell of handover is an NR cell and may not apply the UL-CL when the target cell is not the NR cell. Here, the UL-CL is a functionality supported by a UPF that aims at diverting traffic (locally) to local data networks based on traffic matching filters applied to the UE traffic.

4) NR cell access may not be permitted according to a UE. In accordance with the present invention, if a handover request message provides RAT type information indicating that a target RAT is not eLTE but NR, a target AMF may use the RAT type information for the purpose of rejecting a handover request after subscription check of a UE. Since QoS for the UE becomes different depending on to which RAT type the UE is handed over, the target AMF may use the RAT type information according to the present invention in order to apply different charging rules to the UE.

Hereinafter, the proposal of the present invention will be described in detail with reference to FIG. 12. Parameter(s) except for newly provided information or parameters in a handover procedure according to the present invention may refer to the handover procedure of 3GPP TS 23.401.

Figure 12:
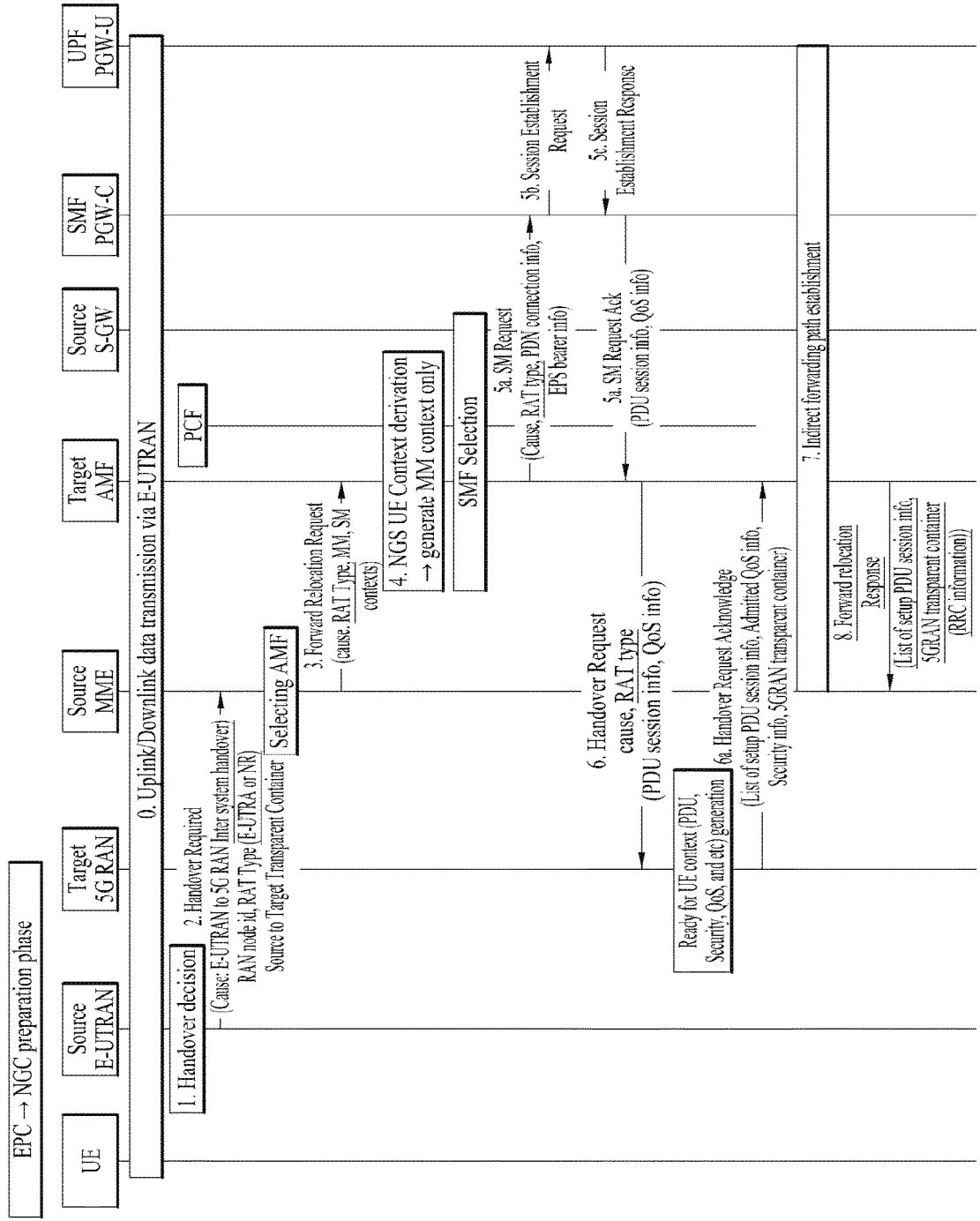
FIG. 12 illustrates an example of a preparation phase for an inter-system or inter-RAN handover between EPC and 5GC according to the present invention.

FIG. 12 illustrates an example of a preparation phase for an inter-system or inter-RAN handover between EPC and 5GC according to the present invention.

While the UE is serviced by an eNB, the eNB may determine that the UE needs to be handed over to a 5G RAN, based on a measurement report received from the UE. In this case, the eNB transmits a handover request message to an MME. For example, as illustrated in FIG. 12, a handover preparation procedure may be performed.

1. A source eNB (e.g. E-UTRAN) determines whether to perform handover based on a measurement result of the UE and a serving condition. While the eNB determines that handover to the target 5G RAN needs to be performed, the eNB recognizes a RAT type (e.g. E-UTRA, NR, etc.) of a target cell. If the target cell is an E-UTRAN cell, the eNB may determine whether to perform handover in consideration of core information etc. supported by the target cell.

2. The eNB generates and transmits a Handover Required message in order to request that an MME hand over the UE to an NGC. The Handover Required message may include RAT type information indicating to which access technology of the 5G RAN handover is requested, in addition to a cause value demanding inter-system handover to the NGC or a handover type. That is, the RAT type information in addition to RAN type information may be provided to the MME. Further, a Source to Target transparent container which is applied to the UE in a source E-UTRAN may be included in the Handover Required message. In addition, target RAN node ID information may be included in the Handover Require message. Next, the source MME selects a target AMF that is to provide a service to the UE. In this case, the target RAN node id information and the RAT type information may be used.

3. The source MME transmits a Forward Relocation Request to the target AMF. The Forward Relocation Request message includes handover cause information, a RAT type, and MM and SM contexts of the UE. The SM context may include information about a PDN session serviced to the UE and QoS. According to a PDN context included in the SM context, the AMF may select a proper SMF (or the same SMF as a previously used PGW-C) and transmit PDN context information (EPS bearer information and QoS information).

4. The target AMF generates an MM-related UE context information (e.g. security). Then, the target AMF selects an SMF by the information received in step 3. Step 4 may be performed on a per PDN connectivity basis.

5. The SMF generates PDU session establishment information of the UE using the received PDN connection information (e.g. bearer information, QoS information, etc.). In this case, the SMF may apply a different QoS policy according to whether a RAT type of the UE is E-UTRA or NR. For example, if an operator differently applies QoS mapping between E-UTRA of an EPC and E-UTRA of an NGC and QoS mapping between E-UTRA of the EPC and NR of the NGC, the operator may define a proper QoS mapping rule according to a RAT type. A PCF may provide the QoS mapping rule to the BS and the UE through the SMF. In consideration of the fact that an NR cell has smaller coverage than an E-UTRA cell, the RAT type information may be used to configure an SSC mode. In addition, it may be determined whether to apply a UL-CL to reduce traffic of a local data network (DN) using the RAT type information. Thereafter, the SMF may establish a path for a corresponding PDU session. The SMF transmits handover-related acknowledgement (e.g. SM Request Ack) to a target AMF. The handover-related acknowledgement may include a PDU session to which the SMF desires to be set up and information about corresponding QoS.

6. The target AMF receives the handover-related acknowledgement from the SMF. Upon recognizing that at least one PDU session will be established, the target AMF transmits a Handover Request message to the target 5G RAN. In this case, the target AMF also transmits the PDU session to which the SMF is requested to be set up and the QoS information. The target 5G RAN performs resource allocation for the UE in consideration of a RAT type of the UE. The target 5G RAN generates RRC information that the UE has applied to the 5G RAN, using RRC information received in the transparent container. In this case, the target 5G RAN generates a Target to Source transparent container including the generated RRC information and transmits information about a PDU session finally accepted by the target 5G RAN and information about admitted QoS to the target AMF.

7. An indirect data path for data forwarding is established.

8. Since handover preparation between the target CN and the target RAN has been completed, the target AMF transmits a Forward Relocation Response message including the Target to Source transparent value received in step 6 and the finally accepted PDU session id to the source MME. If the Forward Relocation Response message is transmitted to the source MME, the target AMF ends the handover preparation procedure. Next, if the source MME transmits a handover command to the source RAN, a series of procedures such as movement of the UE to the 5G RAN, data forwarding, and handover execution is performed.

According to the present invention, the RAT type information may be added to the Handover Required message, for handover preparation considering a RAT type. The Handover Required message is sent by the source eNB to the MME to request the preparation of resources at the target. In the legacy wireless communication system, the Handover Required message includes information element (IE) "Handover Type" indicating which kind of handover was triggered in the source side. Conventional handover type information has been set to indicate one of "IntraLTE", "LTEtoUTRAN", "LTEtoGERAN", "UTRANtoLTE", and "GERANtoLTE". As an NR system has been introduced, handover type information should be capable of further indicating NR system related handover. In the present invention, the handover type information may indicate a 5G RAN as a source RAN or a target RAN. For example, "LTEto5GRAN" or "5GRANtoLTE" may be set as the handover type information. Accordingly, in the present invention, the handover type information in the Handover Required message may be set to a value indicating "IntraLTE", "LTEtoUTRAN", "LTEtoGERAN", "UTRANtoLTE", "GERANtoLTE", "LTEto5GRAN", or "5 GRANtoLTE". According to the present invention, an IE indicating a RAT type may be introduced as an IE distinguished from an IE indicating a handover type. The IE RAT Type indicates which type of RAT was triggered for handover in the source side. For example, the RAT type information may be included in the Handover Request message separately from handover type information which is RAN type information. The RAT type information may be set to a value indicating "5GRAN-EUTRA" or "5GRAN-NR".

Instead of additionally defining a RAT type separately from a handover type, the handover type may be configured to designate a RAT type of the 5G RAN. That is, handover type information may be defined to identify the RAT type as well as the RAN type. For example, in the case of handover between LTE and the 5G RAN, handover type values (e.g., LTEto5GRANLTE, 5GRANLTEtoLTE, LTEto5GRANNR, and 5GRANNRtoLTE) may be defined to indicate the target RAT as well as the target RAN. Handover type information in the Handover Required message may be set to a value indicating, for example, "IntraLTE", "LTEtoUTRAN", "LTEtoGERAN", "UTRANtoLTE", "GERANtoLTE", "LTEto5GRANLTE", "5GRANLTEtoLTE", "LTEto5GRANNR", or "5GRANNRtoLTE". In this case, in addition to the MME, other core network nodes may be implemented by expanding the handover type as mentioned above or generating the RAT type.

The present invention is not limited to inter-RAT/inter-system handover and may be applied to handover between gNBs. The present invention may also be applied to the case in which heterogeneous radio technology cells are serviced by the same core network, i.e., the case in which cells supporting heterogeneous radio technologies are connected to the same BS or RAN node that provides a unique interface to a core network.

Figure 13:
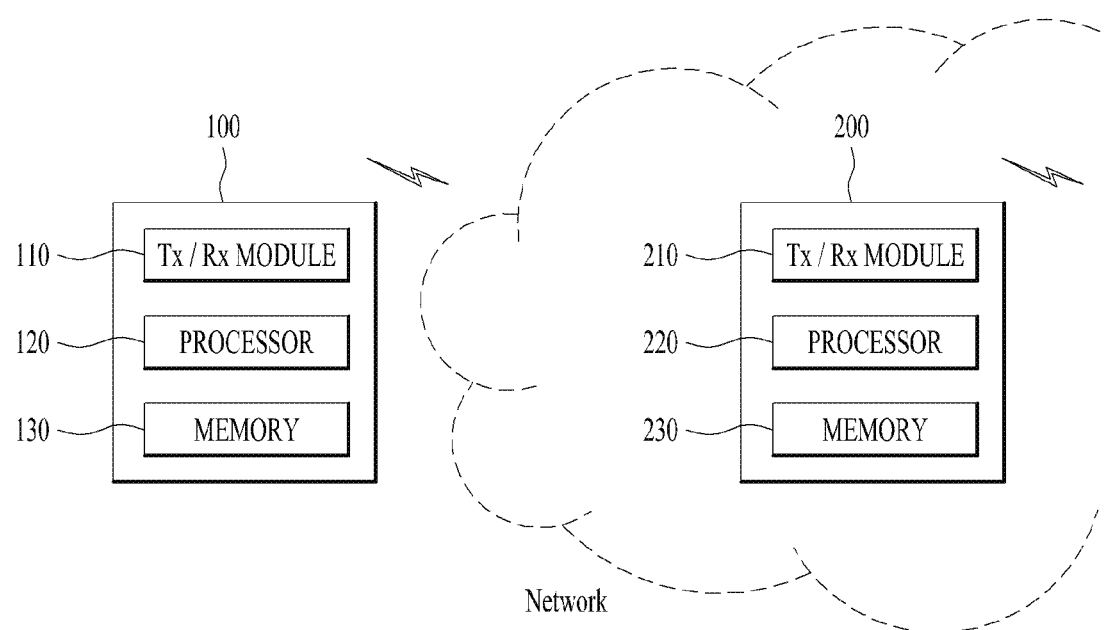
FIG. 13 illustrates a node according to an embodiment of the present invention.

FIG. 13 illustrates configuration of a UE and a network node according to a preferred embodiment of the present invention.

The UE 100 according to the present invention may include a transceiver 110, a processor 120, and a memory 130. The transceiver 110 may be referred to as a radio frequency (RF) unit. The transceiver 110 may be configured to transmit and receive various signals, data and information to and from an external device. The UE 100 may be connected to the storage device by wire and/or wirelessly. The processor 150 may control overall operation of the UE 100, and be configured to calculate and process information for the UE 100 to transmit and receive to and from the external device. In addition, the processor 120 may be configured to perform the proposed operations of the UE. The memory 130 may store the calculated and processed information for a predetermined time, and may be replaced by another constituent such as a buffer (not shown).

Referring to FIG. 13, the network node 200 according to the present invention may include a transceiver 210, a processor 220 and a memory 230. The transceiver 210 may be referred to as an RF unit. The transceiver 210 may be configured to transmit and receive various signals, data and information to and from an external device. The network node 200 may be connected to the storage device by wire and/or wirelessly. The processor 220 may control overall operation of the network node 200, and be configured to calculate and process information for the network node 200 to transmit and receive to and from the external device. In addition, the processor 220 may be configured to perform the proposed operations of the network node. The memory 230 may store the calculated and processed information for a predetermined time, and may be replaced by another constituent such as a buffer (not shown).

For configuration of the UE 100 and the network apparatus, the details described in various embodiments of the present invention may be independently applied or implemented such that two or more embodiments are simultaneously applied. For simplicity, redundant description is omitted.

The embodiments of the present invention may be implemented through various means. For example, the embodiments may be implemented by hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The communication method described above is applicable to various wireless communication systems including IEEE 802.16x and 802.11x systems as well as a 3GPP system. Furthermore, the proposed method is applicable to a millimeter wave (mmWave) communication system using an ultrahigh frequency band.

What is claimed is:

1. A method for a base station (BS), the method comprising:

determining, by the BS, whether handover of a user equipment (UE) to a target cell is needed; and based on the determination, transmitting, by the BS to a mobility management entity (MME), a handover required message to request the handover, wherein the handover required message comprises (i) first information regarding type of the handover, (ii) second information regarding a radio access technology (RAT) type of the target cell, (iii) third information regarding an identifier of the target cell, and (iv) fourth information regarding a cause of the handover needed;

wherein the second information and the fourth information are forwarded from the MME to access and mobility management function (AMF), wherein the AMF is identified based on the second information and the third information, wherein the MME is configured for mobility management and session management in a long term evolution (LTE) wireless communication system, wherein the AMF is configured for access and mobility management in a next generation (NR) wireless communication system, wherein the first information comprises only one first information element (IE), wherein the only one first IE is selected among a first plurality of predetermined IEs, wherein the first plurality of the predetermined IEs respectively indicate types of the handover different from each other, wherein the first plurality of the predetermined IEs comprise: (i) LTEto5GRAN and (ii) 5GRANtoLTE, wherein the LTEto5GRAN is an IE related to handover from a BS configured in the LTE wireless communication system to a target cell configured in the NR wireless communication system, wherein the 5GRANtoLTE is an IE related to handover from a BS configured in the NR wireless communication system to a target cell configured in the LTE wireless communication system, wherein the second information comprises only one second IE, wherein the only one second IE is selected among a second plurality of predetermined IEs, wherein the second plurality of the predetermined IEs respectively indicate RAT types different from each other, wherein the second plurality of the predetermined IEs comprise: (i) 5GRAN-EUTRA and (ii) 5GRAN-NR, wherein the 5GRAN-EUTRA is an IE related to a target cell configured in the LTE wireless communication system, wherein the 5GRAN-NR is an IE related to a target cell configured in the NR wireless communication system, and wherein the NR wireless communication system is a 3rd generation partnership project (3GPP)-based wireless communication system different from the LTE wireless communication system.

2. The method of claim 1, wherein the BS is an access node of an evolved packet system.

3. A base station (BS) comprising:
a memory; and
at least one processor coupled with the memory, wherein the at least one processor is configured to:
determine whether handover of a user equipment (UE) to a target cell is needed; and
based on the determination, transmit, to a mobility management entity (MME), a handover required message to request the handover, wherein the handover required message comprises (i) first information regarding type of the handover, (ii) second information regarding a radio access technology (RAT) type of the target cell, (iii) third information regarding an identifier of the target cell, and (iv) fourth information regarding a cause of the handover needed;

wherein the second information and the fourth information are forwarded from the MME to access and mobility management function (AMF), wherein the AMF is identified based on the second information and the third information, wherein the MME is configured for mobility management and session management in a long term evolution (LTE) wireless communication system, wherein the AMF is configured for access and mobility management in a next generation (NR) wireless communication system, wherein the first information comprises only one first information element (IE), wherein the only one first IE is selected among a first plurality of predetermined IEs, wherein the first plurality of the predetermined IEs respectively indicate types of the handover different from each other, wherein the first plurality of the predetermined IEs comprise: (i) LTEto5GRAN and (ii) 5GRANtoLTE, wherein the LTEto5GRAN is an IE related to handover from a BS configured in the LTE wireless communication system to a target cell configured in the NR wireless communication system, wherein the 5GRANtoLTE is an IE related to handover from a BS configured in the NR wireless communication system to a target cell configured in the LTE wireless communication system, wherein the second information comprises only one second IE, wherein the only one second IE is selected among a second plurality of predetermined IEs, wherein the second plurality of the predetermined IEs respectively indicate RAT types different from each other, wherein the second plurality of the predetermined IEs comprise: (i) 5GRAN-EUTRA and (ii) 5GRAN-NR, wherein the 5GRAN-EUTRA is an IE related to a target cell configured in the LTE wireless communication system, wherein the 5GRAN-NR is an IE related to a target cell configured in the NR wireless communication system, and wherein the NR wireless communication system is a 3rd generation partnership project (3GPP)-based wireless communication system different from the LTE wireless communication system.

4. The BS of claim 3, wherein the BS is an access node of an evolved packet system network.

* * * * *